United States Patent
Astrike

(10) Patent No.: US 10,124,707 B2
(45) Date of Patent: Nov. 13, 2018

(54) VEHICLE FLOOR WITH CORRUGATED CARPETING FOR INCREASED RIGIDITY

(71) Applicant: Toyota Motor Engineering & Manufacturing North America, Inc., Erlanger, KY (US)

(72) Inventor: Logan R. Astrike, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 54 days.

(21) Appl. No.: 14/947,453

(22) Filed: Nov. 20, 2015

(65) Prior Publication Data
US 2017/0144576 A1    May 25, 2017

(51) Int. Cl.
   *B60N 3/04*    (2006.01)
(52) U.S. Cl.
   CPC .................. *B60N 3/042* (2013.01)
(58) Field of Classification Search
   CPC ........ B60N 3/048; B60N 3/044; B60N 3/046; B60N 3/042; B60N 2002/363; B60N 3/04; B60N 2/36
   USPC ...... 296/97.23, 39.1, 39.3, 100.1, 6.09, 191; 428/172, 181, 182, 198, 300.7, 92, 95
   See application file for complete search history.

(56) References Cited

U.S. PATENT DOCUMENTS

| | | | | |
|---|---|---|---|---|
| 3,015,149 A | * | 1/1962 | Foster | D03D 27/00 139/391 |
| 4,966,799 A | | 10/1990 | Lucca et al. | |
| 5,439,725 A | * | 8/1995 | Roberts | B60N 3/044 296/97.23 |
| 5,749,993 A | * | 5/1998 | Denney | B62D 3/281 156/214 |
| 6,534,145 B1 | | 3/2003 | Boyles | |
| 6,595,321 B1 | * | 7/2003 | Tompson | A47L 23/266 181/286 |
| 6,631,785 B2 | * | 10/2003 | Khambete | B32L 311/04 181/204 |
| 7,658,984 B2 | * | 2/2010 | Allison | B32L 327/12 428/131 |

OTHER PUBLICATIONS

"Lund 583002-B Catch-It Carpet Black Front Seat Floor Mat"; retrieved from the Internet: <http://www.amazon.com/Lund-583002-B-Catch--Carpet-Black/dp/B00445RCIU/ref=sr_1_> Retrieved Jul. 24, 2015; (8 pages).
"3D MAXpider Front Row Custom Fit Floor Mat for Select Ford Fusion Models—Classic Carpet (Black)"; retrieved from the Internet: <http://www.amazon.com/3D-MAXpider-Custom-Select-Fusion/dp/B00JL1QEPO> Retrieved Jul. 24, 2015; (5 pages).

* cited by examiner

*Primary Examiner* — D Glenn Dayoan
*Assistant Examiner* — Sunsurraye Westbrook
(74) *Attorney, Agent, or Firm* — Christopher G. Darrow; Darrow Mustafa PC

(57) ABSTRACT

A vehicle includes a vehicle floor. The vehicle floor includes a rigid floor structure and a floor covering for the floor structure. The floor covering includes carpeting with a corrugated section where the carpeting has a nominal surface contour corresponding to the shape of the floor structure, and is repeatedly doubled over itself in a corrugation direction to define a series of adjacent ridges and valleys along the corrugation direction.

20 Claims, 5 Drawing Sheets

VEHICLE FLOOR WITH CORRUGATED CARPETING FOR INCREASED RIGIDITY

TECHNICAL FIELD

The embodiments disclosed herein generally relate to vehicles and more particularly to vehicle floors.

BACKGROUND

The body of a typical vehicle has a floor with a rigid floor structure. In these vehicles, the passenger compartment is usually defined in part by a floor covering for the floor structure. This floor covering may include, for instance, a sound attenuating silencer overlying the floor structure and carpeting overlying the silencer.

Any combination of design criteria may call for increased rigidity across some spans of the carpeting. Measures for realizing this increased rigidity may include, for example, using separate backing materials for the carpeting, increasing the cross sectional thickness of the carpeting or increasing the density of the carpeting.

SUMMARY

Disclosed herein are embodiments of a vehicle floor including carpeting with a corrugated section. In one aspect, a vehicle includes a vehicle floor. The vehicle floor includes a rigid floor structure and a floor covering for the floor structure. The floor covering includes carpeting with a corrugated section where the carpeting has a nominal surface contour corresponding to the shape of the floor structure, and is repeatedly doubled over itself in a corrugation direction to define a series of adjacent ridges and valleys along the corrugation direction.

In another aspect, a floor covering for a vehicle floor includes carpeting with a corrugated section where the carpeting has a nominal surface contour, and is repeatedly doubled over itself in a corrugation direction to define a series of adjacent ridges and valleys along the corrugation direction. The carpeting's rigidity in its nominal surface contour is increased in its corrugated section across the corrugation direction compared to the rigidity in an otherwise similar non-corrugated section of the carpeting.

In yet another aspect, a vehicle floor includes a rigid floor structure and a floor covering for the floor structure. The vehicle floor has a transitional area where the floor structure has two principal surfaces that transition into one another in a cross sectional transitional plane. The floor covering includes carpeting with a corrugated section in the floor's transitional area where the carpeting has a nominal surface contour corresponding to the shape of the floor structure's two principal surfaces and the transition between them, and is repeatedly doubled over itself in a corrugation direction across the transitional plane to define a series of adjacent ridges and valleys along the corrugation direction. The carpeting's rigidity in its nominal surface contour is increased in its corrugated section in the transitional plane to promote the maintenance of its shape in correspondence to the shape of the floor structure's two principal surfaces and the transition between them in the transitional plane compared to the rigidity in an otherwise similar non-corrugated section of the carpeting.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle that includes a floor covering whose carpeting has one or more corrugated sections. In each of its corrugated sections, the carpeting has a nominal surface contour, and is additionally repeatedly doubled over itself in one or more corrugation directions to define a series of adjacent ridges and valleys along those corrugation directions. Among other things, the carpeting may have increased rigidity in each of its corrugated sections compared to the rigidity in otherwise similar non-corrugated sections of the carpeting.

Figure 1:
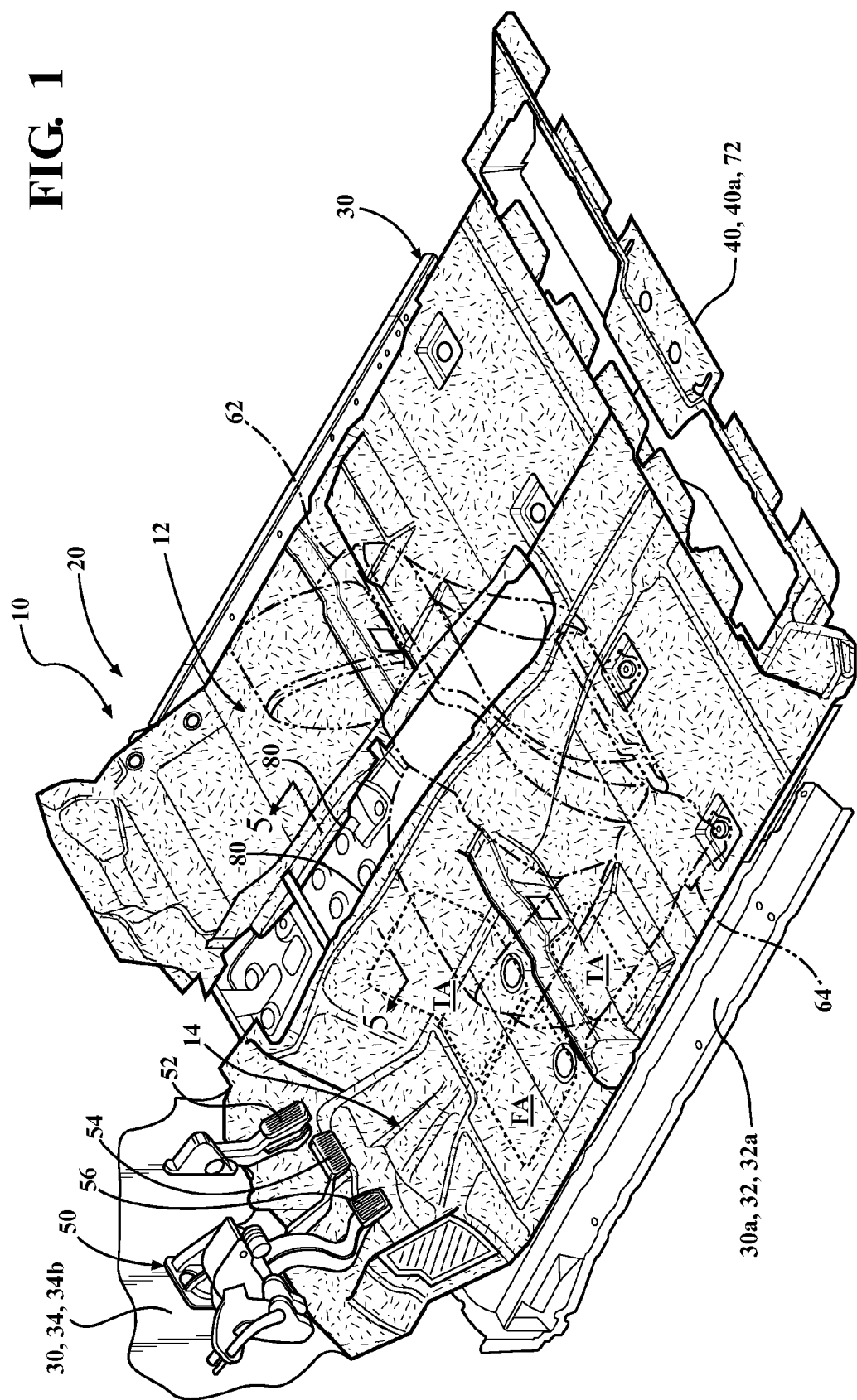
FIG. 1 is an assembly view of a part of a vehicle that has a pedal assembly and a floor, showing a floor structure and a floor covering for the floor structure, with carpeting of the floor covering being visible.

A part of a representative vehicle 10 is shown in FIG. 1. In this description, uses of "front," "forward" and the like, and uses of "rear," "rearward" and the like, refer to the longitudinal direction of the vehicle 10. "Front," "forward" and the like refer to the front (fore) of the vehicle 10, while "rear," "rearward" and the like refer to the back (aft) of the vehicle 10.

The vehicle 10, of which a part is shown in FIG. 1, has a number of inner compartments, including a passenger compartment 12 with a recessed footwell 14 for accommodating the feet and outstretched legs of a driver of the vehicle 10.

The vehicle 10 has a body that forms the exterior of the vehicle 10 and defines the passenger compartment 12 and other interior compartments. For the part of the vehicle 10 shown, the body has a floor 20. For other parts of the vehicle 10, it will be understood that the body may further have upright sides with doors, a front end, a rear end, a roof and a hood, among other things.

The body includes a rigid body structure 30 constructed from, among other things, interconnected frame members 32 and body panels 34, as well as coverings 40 overlying the inside of the body structure 30. The body structure 30 encloses the passenger compartment 12 and other interior compartments, and for one, some or all of the inner compartments enclosed by the body structure 30, the coverings 40 overlay otherwise exposed portions of the inside of the body structure 30 enclosing those inner compartments. The coverings 40 may be cosmetic or functional, or both, and may be, or include, paneling, trim or upholstery, or any combination of these. In general, for a given inner compartment of the vehicle 10, the coverings 40, together with exposed portions of the inside of the body structure 30, if any, define the inner compartment, in whole or in part.

Figure 2:
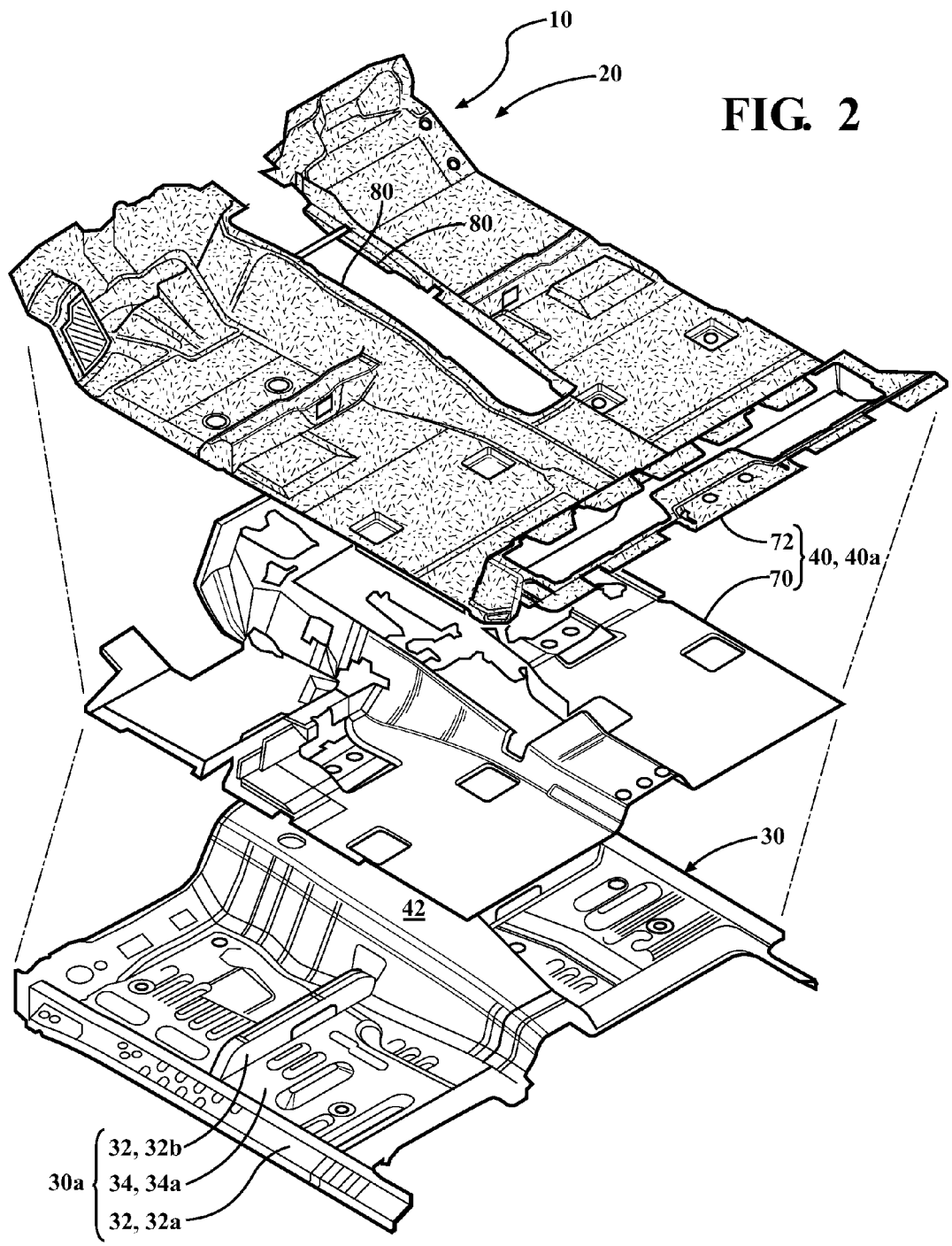
FIG. 2 is an exploded view of the floor of the part of the vehicle shown in FIG. 1, with a silencer of the floor covering additionally being visible.

With additional reference to FIG. 2, for the part of the vehicle 10 shown, the frame members 32 of the body structure 30 include a pair of spaced longitudinally extending side rails 32a and one or more transversely extending cross members 32b (one visible, with the other being a mirror image), and the body panels 34 of the body structure 30 include a horizontally disposed floor pan 34a with a raised, longitudinally extending transmission tunnel 42 and an upright firewall 34b separating the passenger compartment 12 from an engine compartment or other interior compartment defined by the body forward of the passenger compartment 12.

For the floor 20 of the body, the pair of spaced longitudinally extending side rails 32a, the transversely extending cross members 32b and the floor pan 34a collectively form a floor structure 30a, the inside of which encloses, in part, the passenger compartment 12 of the vehicle 10. In the floor structure 30a, the floor pan 34a is connected between the pair of spaced longitudinally extending side rails 32a, and the transversely extending cross members 32b are each connected to the floor pan 34a and between its transmission tunnel 42 and a respective one of the pair of spaced longitudinally extending side rails 32a. The firewall 34b is connected to the front of the floor pan 34a, with portions of the firewall 34b bordering the front of the floor pan 34a additionally forming the floor structure 30a, and with the front of the floor pan 34a and the firewall 34b enclosing, in part, the footwell 14 of the passenger compartment 12.

The floor 20 of the body includes a floor covering 40a for the floor structure 30a. The floor covering 40a overlies otherwise exposed portions of the inside of the floor structure 30a and defines, together with exposed portions of the inside of the floor structure 30a, if any, the passenger compartment 12, in whole or in part. For the part of the vehicle 10 shown, the passenger compartment 12 is largely defined by the floor covering 40a, although for other parts of the vehicle 10, it will be understood that the passenger compartment 12 may further be defined by other coverings 40 and window panels, for instance, together with exposed portions of the inside of the body structure 30, if any.

In the passenger compartment 12, the vehicle 10 includes, among other things, a pedal assembly 50. The pedal assembly 50 includes an accelerator pedal 52, a brake pedal 54 and an optional clutch pedal 56, each of which is pivotally connected to the firewall 34b for manual depression from a rearward release position to one or more forward actuation positions and for automatic return movement to the release position, and positioned in suspension in the footwell 14 over a driver's side footwell area of the floor 20.

The vehicle 10 further includes seats housed in its passenger compartment 12, which are represented by a driver's seat 62. Although these seats are represented by the driver's seat 62, it will be understood that other seats may be housed in the passenger compartment 12, such as a passenger seat and one or more rear seats. The driver's seat 62 includes a mounting bracket 64 mounted to the floor structure 30a at a driver's seat area of the floor 20 rear of, but bordering, a driver's side footwell area. The mounting bracket 64 supports the remainder of the driver's seat 62 in position in the passenger compartment 12, rear of the footwell 14, over the driver's seat area.

As shown particularly with reference to FIG. 2, the floor covering 40a for the floor structure 30a includes a sound attenuating silencer 70 overlying the floor structure 30a and carpeting 72 overlying the silencer 70. Although the floor covering 40a could include additional interleaved components, as shown, the silencer 70 rests in contact on the floor structure 30a, and the carpeting 72 rests in contact on the silencer 70. More specifically, with the silencer 70 defining a bottom surface and a top surface, and the carpeting 72 similarly defining a bottom surface and a top surface, the bottom surface of the silencer 70 rests in contact on the floor structure 30a, and the bottom surface of the carpeting 72 rests in contact on the top surface of the silencer 70, with the top surface of the carpeting 72 being that which largely defines the passenger compartment 12 for the part of the vehicle 10 shown.

The silencer 70 is generally configured to absorb, deflect, or otherwise attenuate the transmission of sound waves from the outside of the vehicle 10 to its passenger compartment 12 via the floor structure 30a and other portions of the body structure 30 which it overlies, such as the upper portions of the firewall 34b. The silencer 70 may be particularly configured to attenuate the transmission of sound waves representing noise, vibration and harshness (NVH), for example. The silencer 70 may be composed of any suitable material or combination of materials. The material of the silencer 70 may be, or include, recycled cotton or polyethylene terephthalate (PET) fibers, together with any suitable binder, for example.

The carpeting 72 is generally configured to provide a durable but attractive outer layer to the floor covering 40a. The carpeting 72 may but need not contribute to the attenuation of the transmission of sound waves by the silencer 70. The carpeting 72 may be any automotive grade carpeting composed of any suitable material or combination of materials.

As generally shown, the floor structure 30a has many surface features and, as a result, a complex surface geometry, both as a product of the individual surfaces of the components of the floor structure 30a and as a product of their interconnection with one another to form the floor structure 30a.

The floor 20 may have one or more flat areas FA where the floor structure 30a has a generally flat principal surface. As shown with combined reference to FIGS. 1 and 2, the floor 20 may have a flat area FA where the floor structure 30a has a substantially flat principal surface across an uninterrupted span of the floor pan 34a, for example.

The floor 20 may also have one or more transitional areas TA where the floor structure 30a has two principal surfaces that transition into one another. In a given transitional area TA, the two principal surfaces that transition into one another may be generally flat and angled to one another. The two principal surfaces that transition into one another may be angled normally to one another or angled obtusely to one another, for example. The transition between the two principal surfaces may be a corner at which they meet. Alternatively, the transition between the two principal surfaces could be rounded or chamfered.

As shown once again with combined reference to FIGS. 1 and 2, the floor 20 may have a transitional area TA where the floor structure 30a has a principal surface across a span of the floor pan 34a that transitions into another principal surface across an upright face of the floor pan 34a at its transmission tunnel 42, for example. Similarly, the floor 20 may, as shown, have a transitional area TA where the floor structure 30a has a principal surface across a span of the floor pan 34a that transitions into another principal surface across an upright face of one of the transversely extending cross members 32b, for example.

To accommodate the complex surface geometry of the floor structure 30a, the silencer 70 is shaped to correspond to the shape of the floor structure 30a. Where the silencer 70 rests in contact on the floor structure 30a, the bottom surface of the silencer 70 may be shaped to match the shape of the floor structure 30a. This shape, moreover, may be generally maintained at the top surface of the silencer 70. The silencer 70 may, for example, be vacuum formed in a mold that imparts a shape to its material that corresponds to the shape of the floor structure 30a.

Figure 3:
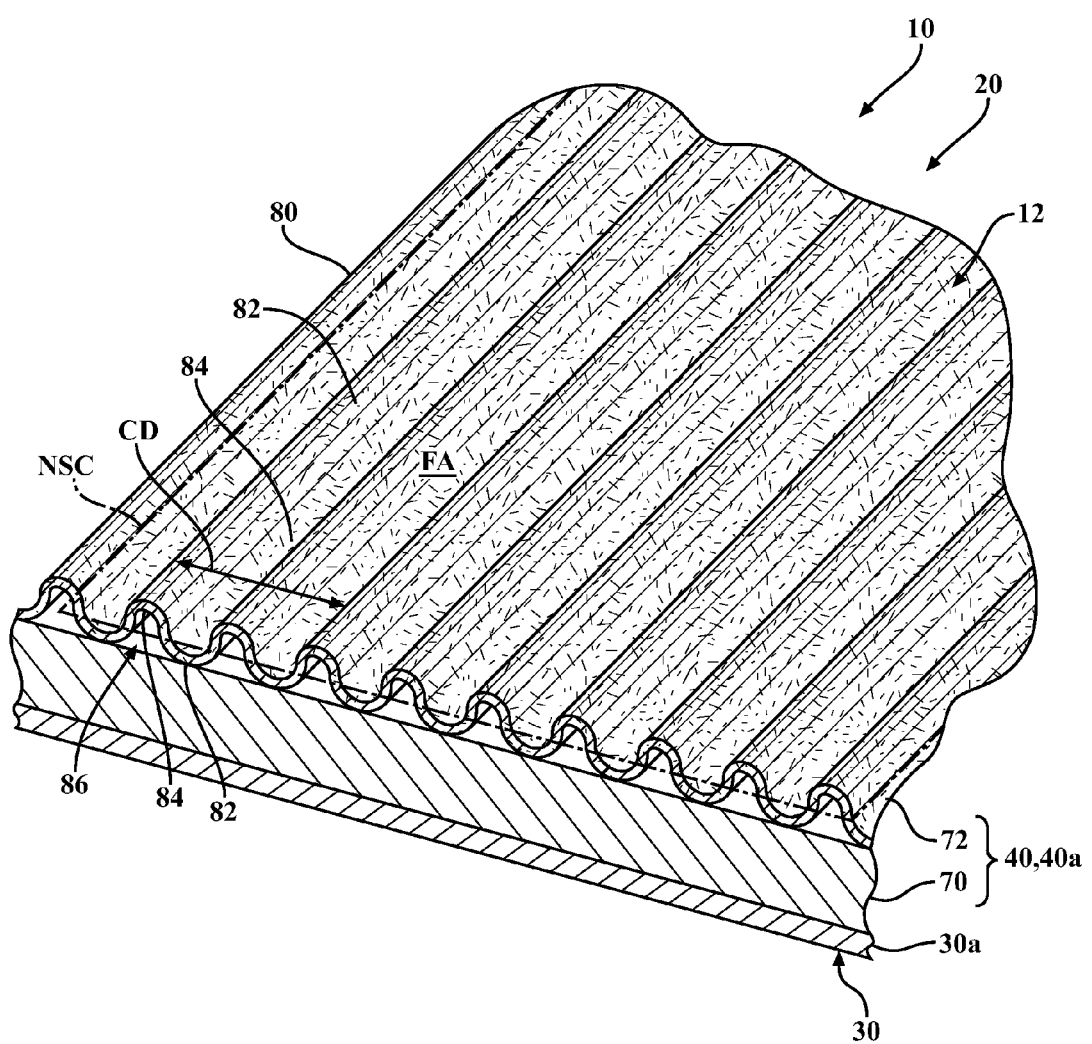
FIG. 3 is a representative cross sectional view of the part of the vehicle taken across a flat area of the floor, and showing a corrugated section of the carpeting in the flat area of the floor.
Figure 4:
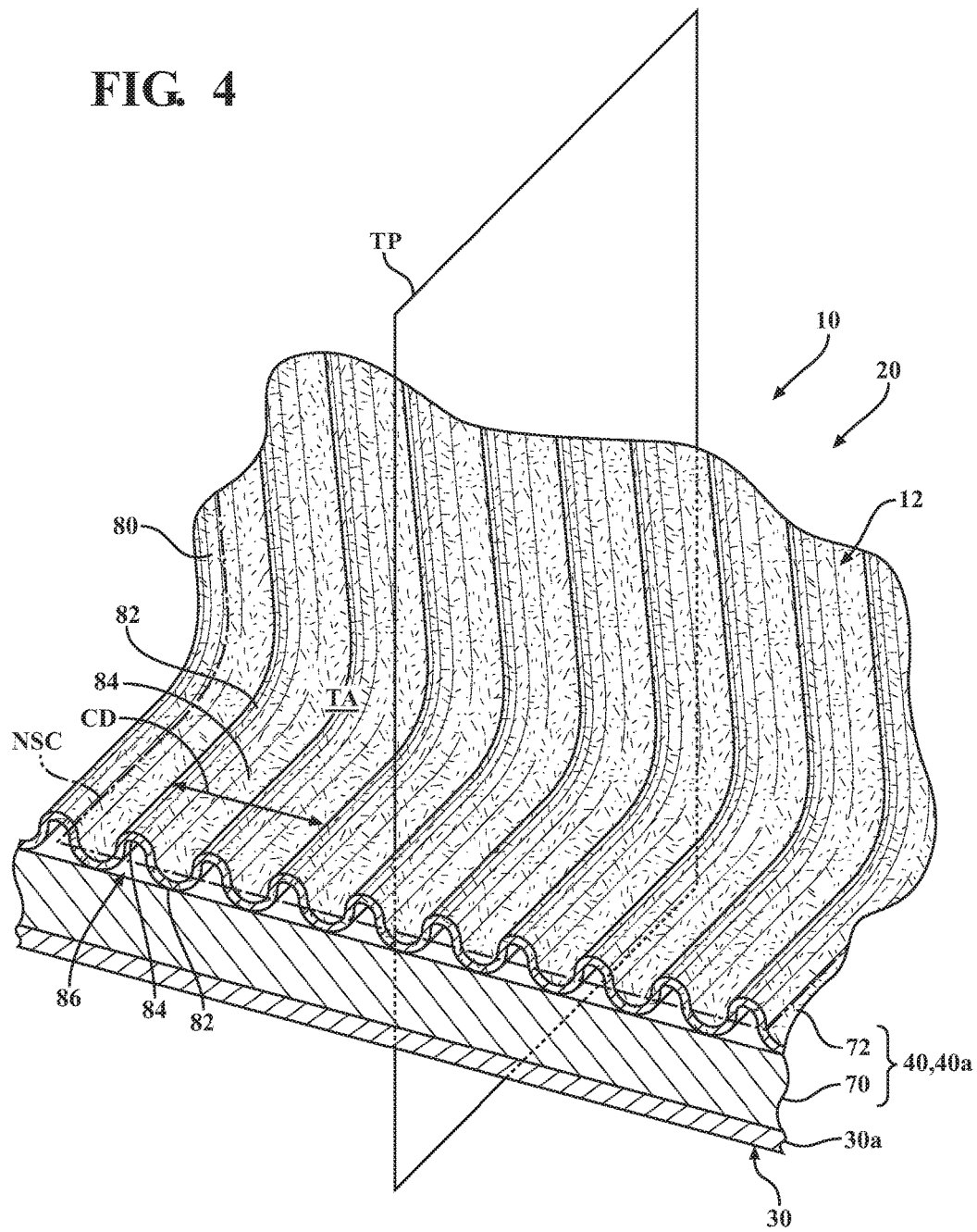
FIG. 4 is a representative cross sectional view of the part of the vehicle taken across a transitional area of the floor, and showing a corrugated section of the carpeting in the transitional area of the floor.

The carpeting 72 is likewise shaped to correspond to the shape of the floor structure 30a. As shown in FIGS. 3 and 4, the carpeting 72 may have one or more corrugated sections 80 in which the carpeting 72 is corrugated. In each of its corrugated sections 80, the carpeting 72 has a nominal surface contour NSC corresponding to the shape of the floor structure 30a, and is additionally repeatedly doubled over itself in one or more corrugation directions CD. This defines a series of adjacent ridges 82 and valleys 84 along those corrugation directions CD. Although the series of adjacent ridges 82 and valleys 84 is shown as generally simulating a sine wave, the series of adjacent ridges 82 and valleys 84 could alternatively simulate a square wave or a triangular wave, for example. As shown, in any given corrugated section 80, the carpeting 72 may be repeatedly doubled over itself in one corrugation direction CD. Alternatively, in any given corrugated section 80, the carpeting 72 could be repeatedly doubled over itself in two or more corrugation directions CD.

In each of its corrugated sections 80, the cross sectional thickness of the carpeting 72 may be substantially constant. Accordingly, each ridge 82 defined at the bottom surface of the carpeting 72 may correspond to a valley 84 defined at the top surface of the carpeting 72, and each valley 84 defined at the bottom surface of the carpeting 72 may correspond to a ridge 82 defined at the top surface of the carpeting 72. The cross sectional thickness of the carpeting 72 in its corrugated sections 80 may be substantially the same as the cross sectional thickness of any remaining non-corrugated sections. The carpeting 72 may, for example, be cut into a blank and formed in a heated mold to take a shape corresponding to the shape of the floor structure 30a, and to include the one or more corrugated sections 80 in which the carpeting 72 is corrugated.

Where the carpeting 72 rests in contact on the silencer 70, in each of its corrugated sections 80, the ridges 82 defined at the bottom surface of the carpeting 72 contact the top surface of the silencer 70. This may leave spaces 86 between the top surface of the silencer 70 and the valleys 84 defined at the bottom surface of the carpeting 72. Otherwise, in any remaining non-corrugated sections, the bottom surface of the carpeting 72 may be shaped to match the shape of the top surface of the silencer 70. This shape, moreover, may be generally maintained at the top surface of the carpeting 72.

Collectively, the one or more corrugated sections 80 of the carpeting 72 may constitute all of the carpeting 72 or any part of the carpeting 72. If the carpeting 72 includes one corrugated section 80, the corrugated section 80 of the carpeting 72 may constitute all of the carpeting 72 or any part of the carpeting 72. If the carpeting 72 includes more than one corrugated section 80, the corrugated sections 80 of the carpeting 72 may collectively constitute all of the carpeting 72 or any part of the carpeting 72. Any given corrugated section 80 of the carpeting 72 may be contiguous or non-contiguous with other corrugated sections 80 of the carpeting 72.

Among other things, the carpeting 72 may have increased rigidity in each of its corrugated sections 80 compared to the rigidity in otherwise similar non-corrugated sections of the carpeting 72. More specifically, in each of its corrugated sections 80, the carpeting 72 may have this increased rigidity in its nominal surface contour NSC across the one or more corrugation directions CD in which the carpeting 72 is repeatedly doubled over itself. This increased rigidity may equate to an increased resistance to bending, in which case, in each of its corrugated sections 80, the carpeting 72 may have an increased resistance to bending in its nominal surface contour NSC about the one or more corrugation directions CD.

The one or more corrugated sections 80 of the carpeting 72 may be employed across spans of the carpeting 72 where any combination of design criteria calls for increased rigidity in one or more directions compared to the rigidity in otherwise similar non-corrugated sections of the carpeting 72. The carpeting 72, in these corrugated sections 80, may be repeatedly doubled over itself in one or more respective corrugation directions CD across the one or more directions in which increased rigidity is called for.

Across these spans, the corrugated sections 80 may reduce or obviate the otherwise present need for other measures for realizing increased rigidity. These measures could include without limitation using separate backing materials for the carpeting 72, increasing the cross sectional thickness of the carpeting 72 or increasing the density of the carpeting 72, or any combination of these. Instead of implementing these or other measures for realizing increased rigidity, the carpeting 72 may, for example, be cut into one blank with a substantially constant cross sectional thickness, and formed in a heated mold to take a shape corresponding to the shape of the floor structure 30a, and to include the one or more corrugated sections 80. This may save material and assembly costs associated with the carpeting 72, as well as, in the case of otherwise using separate backing materials for the carpeting 72, reduce the number of parts in the carpeting 72.

As shown in FIG. 3, the carpeting 72 may have a corrugated section 80 in a flat area FA of the floor. In the corrugated section 80, the carpeting 72 has a nominal surface contour NSC corresponding to the shape of the generally flat principal surface of the floor structure 30a. The carpeting 72 is additionally repeatedly doubled over itself in the corrugation direction CD to define the series of adjacent ridges 82 and valleys 84 along the corrugation direction CD.

In the corrugated section 80, the carpeting 72 has increased rigidity in its nominal surface contour NSC across the corrugation direction CD in which the carpeting 72 is repeatedly doubled over itself compared to the rigidity in an otherwise similar non-corrugated section of the carpeting 72. This increased rigidity may equate to an increased resistance to bending, in which case, in the corrugated section 80, the carpeting 72 has an increased resistance to bending in its nominal surface contour NSC about the corrugation direction CD.

In the corrugated section 80, the increased rigidity and the increased resistance to bending in the nominal surface contour NSC of the carpeting 72 promote the maintenance of its nominal surface contour NSC and, accordingly, the maintenance of its shape in correspondence to the shape of the floor structure 30a, in the presence of loading across the corrugation direction CD.

As shown in FIG. 4, the carpeting 72 may have a corrugated section 80 in a transitional area TA of the floor. In the corrugated section 80, the carpeting 72 has a nominal surface contour NSC corresponding to the shape of the two principal surfaces of the floor structure 30a that transition into one another, as well as to the transition between the two principal surfaces. The carpeting 72 is additionally repeatedly doubled over itself in the corrugation direction CD to define the series of adjacent ridges 82 and valleys 84 along the corrugation direction CD.

In the corrugated section 80, the carpeting 72 has increased rigidity in its nominal surface contour NSC across the corrugation direction CD in which the carpeting 72 is repeatedly doubled over itself compared to the rigidity in an otherwise similar non-corrugated section of the carpeting 72. This increased rigidity may equate to an increased resistance to bending, in which case, in the corrugated section 80, the carpeting 72 has an increased resistance to bending in its nominal surface contour NSC about the corrugation direction CD.

In the corrugated section 80, the increased rigidity and the increased resistance to bending in the nominal surface contour NSC of the carpeting 72 promote the maintenance of its nominal surface contour NSC and, accordingly, the maintenance of its shape in correspondence to the shape of the floor structure 30a, in the presence of loading across the corrugation direction CD.

The two principal surfaces of the floor structure 30a transition into one another in a cross sectional transitional plane TP across the nominal surface contour NSC of the carpeting 72 in the corrugated section 80. If the corrugation direction CD is across the transitional plane TP, in the corrugated section 80, the carpeting 72 will have the increased rigidity in its nominal surface contour NSC, as well as the increased resistance to bending in its nominal surface contour NSC, in the transitional plane TP. The increased rigidity and the increased resistance to bending in the nominal surface contour NSC of the carpeting 72 in the transitional plane TP promote the maintenance of its nominal surface contour NSC in the transitional plane TP and, accordingly, the maintenance of its shape in correspondence to the shape of the floor structure 30a in the transitional plane TP, in the presence of loading in the transitional plane TP.

In each of its corrugated sections 80, the carpeting 72 may have improvements compared to otherwise similar non-corrugated sections of the carpeting 72 beyond increased rigidity.

For example, in its non-corrugated sections, the carpeting 72 may be acoustically coupled to the silencer as a product of its bottom surface being shaped to match the shape of the top surface of the silencer 70. On the other hand, in each of its corrugated sections 80, the carpeting 72 may be acoustically decoupled from the silencer across the valleys 84 defined at the bottom surface of the carpeting 72 as a product of the spaces 86 between them and the top surface of the silencer 70. This contributes to the attenuation of the transmission of sound waves by the silencer 70. These spaces 86 may, as shown, be unoccupied, or may be occupied with any suitable material or combination of materials further contributing to the attenuation of the transmission of sound waves by the silencer 70.

Alternatively, or additionally, in each of its corrugated sections 80, the carpeting 72 may have a more interesting aesthetic as a product of the series of adjacent ridges 82 and valleys 84 along the one or more corrugation directions CD in which the carpeting 72 is repeatedly doubled over itself compared to otherwise similar non-corrugated sections of the carpeting 72.

Figure 5:
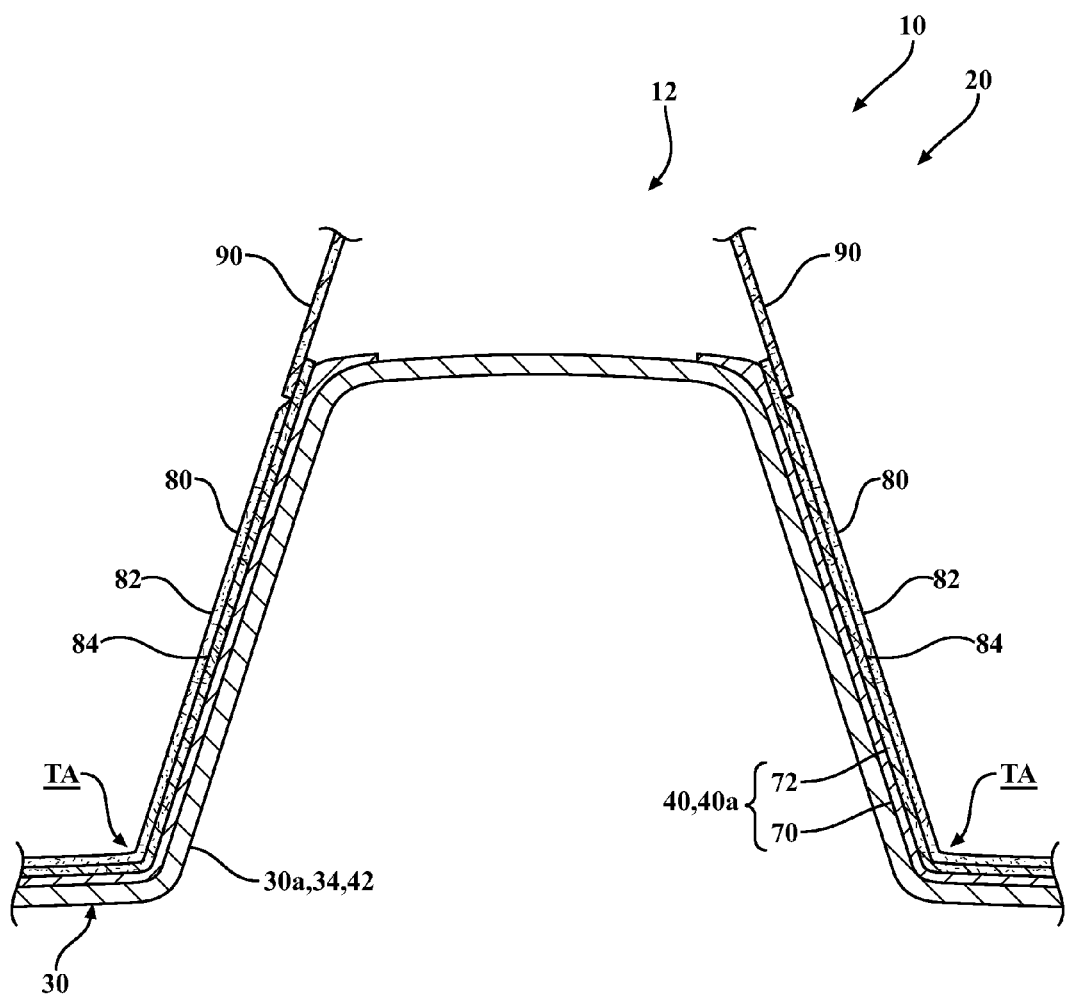
FIG. 5 is a cross sectional view of the part of the vehicle taken along the line 5-5 in FIG. 1, showing a non-corrugated section of the carpeting contiguous with a corrugated section of the carpeting underlying trim.

As shown in FIG. 5, the carpeting 72 may have a corrugated section 80 approaching a place where another component, such as trim 90, overlies otherwise exposed portions of the top surface of the carpeting 72. The carpeting 72 may have a non-corrugated section contiguous with its corrugated section 80 underlying the trim 90 to prevent the spaces 86 that would otherwise be left between the valleys 84 defined at the top surface of the carpeting 72 and the trim 90 with the corrugated section 80 underlying the trim 90.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
    a vehicle floor, the vehicle floor including a rigid floor structure and a floor covering for the floor structure, the floor covering including carpeting with a corrugated section where the carpeting has a nominal surface contour corresponding to the shape of the floor structure, and is repeatedly doubled over itself in a corrugation direction to define a series of adjacent ridges and valleys along the corrugation direction, with ridges and valleys defined at a bottom surface of the carpeting corresponding to valleys and ridges, respectively, defined at a top surface of the carpeting.

2. The vehicle of claim 1, wherein the carpeting's rigidity in its nominal surface contour is increased in its corrugated section across the corrugation direction compared to the rigidity in an otherwise similar non-corrugated section of the carpeting.

3. The vehicle of claim 1, wherein the carpeting's corrugated section is in a flat area of the floor where the floor structure has a generally flat principal surface, with the carpeting's nominal surface contour corresponding to the shape of the floor structure's principal surface.

4. The vehicle of claim 1, wherein the carpeting's corrugated section is in a transitional area of the floor where the floor structure has two principal surfaces that transition into one another, with the carpeting's nominal surface contour corresponding to the shape of the floor structure's two principal surfaces and the transition between them.

5. The vehicle of claim 4, wherein the floor structure's two principal surfaces transition into one another in a cross sectional transitional plane across the carpeting's nominal surface contour, and the corrugation direction is across the transitional plane.

6. The vehicle of claim 1, wherein the carpeting's cross sectional thickness in its corrugated section is substantially constant.

7. The vehicle of claim 1, wherein the carpeting has a non-corrugated section, the carpeting's cross sectional thickness in its corrugated section is substantially constant, and the carpeting's cross sectional thickness in its non-corrugated section is substantially the same as its cross sectional thickness in its corrugated section.

8. The vehicle of claim 1, wherein the floor covering further includes a sound attenuating silencer, with the silencer overlying the floor structure, and the carpeting's corrugated section overlying the silencer.

9. The vehicle of claim 8, wherein spaces are defined between a top surface of the silencer and valleys defined at the bottom surface of the carpeting.

10. The vehicle of claim 9, wherein the spaces are unoccupied.

11. The vehicle of claim 1, wherein the series of adjacent ridges and valleys generally simulates a sine wave.

12. A floor covering for a vehicle floor, comprising:
carpeting with a corrugated section where the carpeting has a nominal surface contour, and is repeatedly doubled over itself in a corrugation direction to define a series of adjacent ridges and valleys along the corrugation direction, with ridges and valleys defined at a bottom surface of the carpeting corresponding to valleys and ridges, respectively, defined at a top surface of the carpeting, wherein the carpeting's rigidity in its nominal surface contour is increased in its corrugated section across the corrugation direction compared to the rigidity in an otherwise similar non-corrugated section of the carpeting.

13. The floor covering of claim 12, wherein, with a cross sectional transitional plane across the carpeting's nominal surface contour, the corrugation direction is across the transitional plane.

14. The floor covering of claim 12, wherein the carpeting's cross sectional thickness in its corrugated section is substantially constant.

15. The floor covering of claim 12, wherein the carpeting's cross sectional thickness in its corrugated section is substantially constant, and the carpeting's cross sectional thickness in its non-corrugated section is substantially the same as its cross sectional thickness in its corrugated section.

16. The floor covering of claim 12, further comprising:
a sound attenuating silencer, with the carpeting's corrugated section overlying the silencer.

17. The floor covering of claim 16, wherein spaces are defined between a top surface of the silencer and valleys defined at the bottom surface of the carpeting.

18. The floor covering of claim 17, wherein the spaces are unoccupied.

19. The floor covering of claim 12, wherein the series of adjacent ridges and valleys generally simulates a sine wave.

20. A vehicle floor, comprising:
a rigid floor structure and a floor covering for the floor structure, the vehicle floor having a transitional area where the floor structure has two principal surfaces that transition into one another in a cross sectional transitional plane, the floor covering including:
carpeting with a corrugated section in the floor's transitional area where the carpeting has a nominal surface contour corresponding to the shape of the floor structure's two principal surfaces and the transition between them, and is repeatedly doubled over itself in a corrugation direction across the transitional plane to define a series of adjacent ridges and valleys along the corrugation direction, with ridges and valleys defined at a bottom surface of the carpeting corresponding to valleys and ridges, respectively, defined at a top surface of the carpeting, wherein the carpeting's rigidity in its nominal surface contour is increased in its corrugated section in the transitional plane to promote the maintenance of its shape in correspondence to the shape of the floor structure's two principal surfaces and the transition between them in the transitional plane compared to the rigidity in an otherwise similar non-corrugated section of the carpeting.

* * * * *